United States Patent [19]

Hasquenoph et al.

[11] 3,942,749

[45] Mar. 9, 1976

[54] DEVICE FOR STEADYING LOADS SUSPENDED FROM AIRCRAFT

[75] Inventors: Jean Henri Hasquenoph, Lagny; Pierre Fernand Coutin, Paris, both of France

[73] Assignee: R. Alkan & Cie, Valenton, France

[22] Filed: Mar. 7, 1974

[21] Appl. No.: 448,952

Related U.S. Application Data

[62] Division of Ser. No. 366,054, June 1, 1973, Pat. No. 3,840,201.

[30] Foreign Application Priority Data
June 9, 1972 France .............................. 72.20897

[52] U.S. Cl. ............................ 244/137 R; 89/1.5 B
[51] Int. Cl.² ......................................... B64D 1/00
[58] Field of Search .................... 244/118 R, 137 R; 294/82 R, 83 R, 83 A, 83 AB, 102 R; 89/1.5 R, 1.5 A, 1.5 B, 1.5 C, 1.5 D, 1.5 F, 1.5 G, 1.5 H; 267/159

[56] References Cited
UNITED STATES PATENTS

| | | | |
|---|---|---|---|
| 3,268,188 | 8/1966 | LaRoe et al. | 244/137 R X |
| 3,635,162 | 1/1972 | Lohkamp et al. | 89/1.5 D X |
| 3,784,132 | 1/1974 | Newell | 244/137 R |

*Primary Examiner*—M. Henson Wood, Jr.
*Assistant Examiner*—Randolph A. Reese
*Attorney, Agent, or Firm*—Ulle C. Linton

[57] ABSTRACT

This device for steadying, notably against lateral oscillation, a load releasably suspended from an aircraft comprises spring urged wedge members mounted to the load; these wedge members in their steading position penetrate between the upper face of the load and the lower face of the carrier member of the aircraft; these wedge members are retracted manually against the force of their spring means to allow the suspension of the load.

2 Claims, 3 Drawing Figures

DEVICE FOR STEADYING LOADS SUSPENDED FROM AIRCRAFT

The present application is a division from our co-pending application Ser. No. 366,054, filed June 1, 1973 and now U.S. Pat. No. 3,840,201 dated Oct. 8, 1974.

BACKGROUND OF THE INVENTION

1. Field of the invention

The present invention relates to means for steadying loads suspended from aircraft.

2. Brief description of the prior art

It is known that loads suspended from aircraft comprise as a rule tapped cavities engaged by correspondingly screw-threaded shanks formed integrally with suspension rings. The hooks carried by the supporting or jettisoning device engage these rings for actually carrying the load. Since these rings are aligned longitudinally, the loads tend to oscillate laterally under the influence of lateral accelerations or other aerodynamic effects, so that it is customary to steady these loads, when supported by the aircraft, by means of transverse bearing elements.

An arrangement generally employed to this end consists in utilizing four steadying or wedging screws engaging tapped orifices formed in four fixed bearing arms and clamping the load laterally.

This arrangement, although very efficient, has various drawbacks: in fact, the bearing arms are relatively heavy and the assembly including the four wedging or steadying screws is objectionable on account of its poor aerodynamic contour. On the other hand, the steadying operation proper requires the tightening of four screws.

SUMMARY OF THE INVENTION

It is the essential object of the present invention to provide an improved device for steadying loads suspended from aircraft which eliminates the inconveniences of prior art systems, while reducing or eliminating the span of the bearing arms.

For this object the load is equipped with wedge members and with spring means urging said wedge members to their steadying position in which they engage the carrier member of the aircraft, said wedge members being adapted to be moved manually to their load-releasing position against the force of said spring means and to be released to their load wedging position in which they operate freely.

BRIEF DESCRIPTION OF THE DRAWINGS

A typical form of embodiment of the present invention will now be described with reference to the attached drawings in which.

DESCRIPTION OF THE PREFERRED EMBODIMENT

Figure 1:
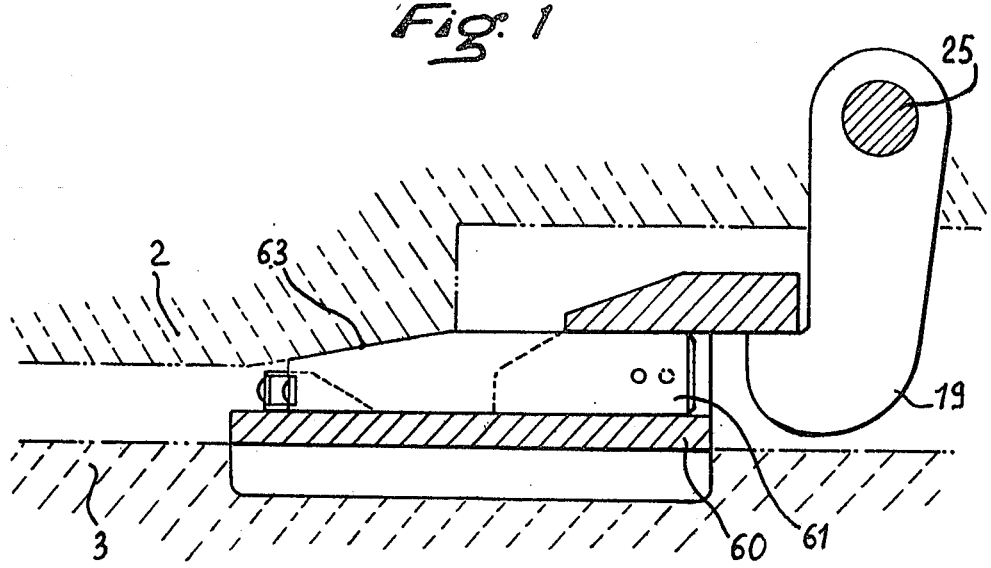
FIG. 1 illustrates diagrammatically in vertical section a steadying device equipping a load suspended from an aircraft.
Figure 2:
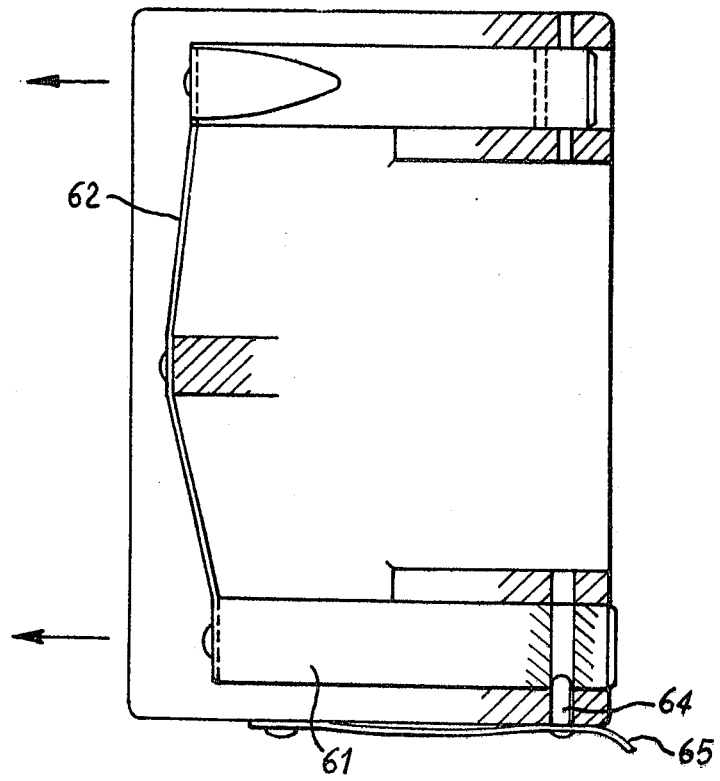
FIG. 2 is a plan view of the device of FIG. 1.
Figure 3:
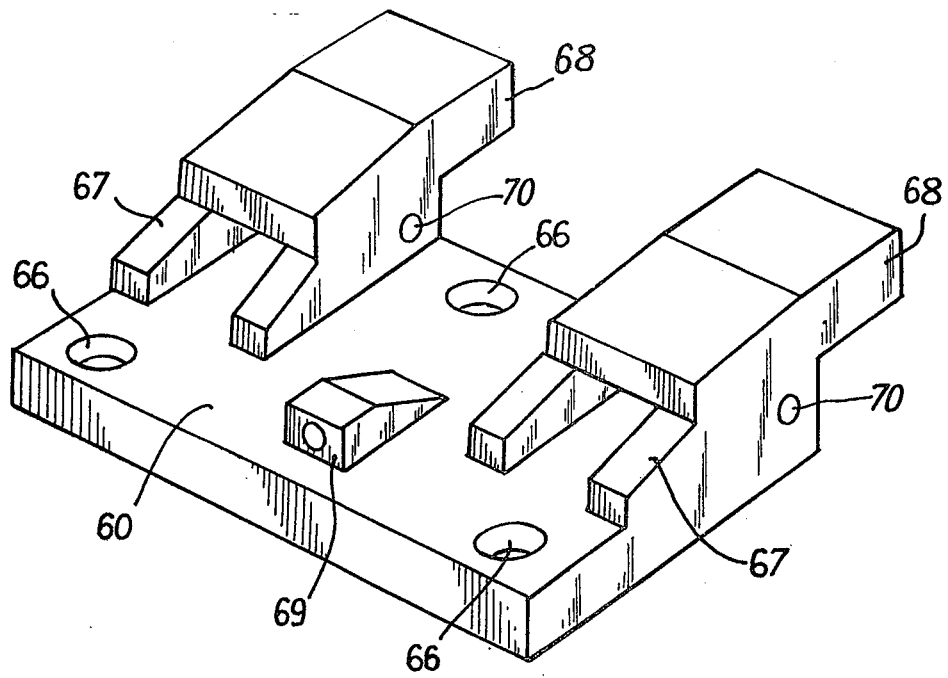
FIG. 3 is a perspective view of the anchoring block forming a part of the present device.

FIG. 1 shows an anchoring block or member 60 secured to the load 3 supported by a fork-shaped hook 19 pivotally connected by means of a pivot pin 25 to a carrier member or support 2 rigid with the aircraft structure (not shown). This anchoring block 60 has formed laterally therein a pair of bores slidably engaged by corresponding wedge members 61 each urged in the direction of the arrows (FIG. 2) by a two-armed spring blade 62. The inclined plane 63 of each wedge member 61 engages a conjugate inclined face formed on said support 2, the spring blade 62 taking up any play likely to develop therebetween. To permit the convenient suspension of the load, the wedge members are manually retracted beforehand and held in this position by a simple cross-pin or stud 64 responsive to a spring blade 65 as shown in the lower portion of FIG. 2. When the load is properly suspended the spring blade 65 is pulled with a finger, thus releasing the corresponding wedge member.

Anchoring block 60 also has holes 66 for receiving screws (not shown) for securing said block to the upper part of load 3. Guide means 67 are rigid with block 60 and wedge members 61 can slide along said guide means. The upper parts 68 of guide means 67 are adapted to be engaged by hook 19. A support 69 is for securing the central portion of spring blade 22 to said block. Transverse holes 70 are provided in guide means 67 for the passage of cross-pins 64.

Thus, the wedging or steadying device is carried directly by the load to be suspended from the aircraft and the preliminary withdrawal of this device can be achieved manually and separately for each wedge member, as illustrated, although a central control may be provided for operating all these members simultaneously, if desired. This particular construction leaves the support unhampered by more or less complicated mechanisms.

What we claim is:

1. Device for steadying loads suspended from aircraft comprising a carrier member being carried by the aircraft, at least one anchoring member being carried by the load, at least one fork-shaped hook pivotally connected to the aircraft and positioned for engaging and supporting said anchoring member, wedge members slideably mounted on said load for movement axially of the load, spring means being carried by said load and tending to move said wedge members between the face of the load and a part of the lower face of said carrier member for ensuring the steadying of the load, and which wedge members can be manually retracted from said carrier member against the action of said spring means.

2. Device according to claim 1 including spring blades carried by said load, pins each carried by one of said spring blades and extending laterally of one of said wedge members, and said wedge members each having a bore positioned for receiving one of said pins when said wedge member is in its retracted position for detachably maintaining said wedge member in said retracted position.

* * * * *